US012801625B2

(12) United States Patent
Jebari et al.

(10) Patent No.: US 12,801,625 B2
(45) Date of Patent: Nov. 17, 2026

(54) DEVICE, SYSTEM AND METHOD FOR OBVIATING CONFLICTS IN DATABASE UPDATES

(71) Applicant: AMADEUS S.A.S., Biot (FR)

(72) Inventors: Reda Jebari, Villeneuve-Loubet (FR); Louis Charles Jacques Rosso, Falicon (FR); Tony Bisegna, Vallauris (FR); Jeremy Junac, Villeneuve-Loubet (FR); Laurent Azemard, Nice (FR); Alois Flavien Tom Nolin, Grasse (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/741,945

(22) Filed: Jun. 13, 2024

(65) Prior Publication Data

US 2024/0427797 A1 Dec. 26, 2024

(30) Foreign Application Priority Data

Jun. 26, 2023 (EP) .................................... 23306014

(51) Int. Cl.
*G06F 16/27* (2019.01)
*G06F 16/21* (2019.01)
(Continued)

(52) U.S. Cl.
CPC ............ *G06F 16/27* (2019.01); *G06F 16/213* (2019.01); *G06F 16/219* (2019.01)

(58) Field of Classification Search
None
See application file for complete search history.

(56) References Cited

U.S. PATENT DOCUMENTS

| | | | | |
|---|---|---|---|---|
| 6,457,065 | B1 | 9/2002 | Rich et al. | |
| 2009/0172101 | A1* | 7/2009 | Arthursson | G06F 3/0486 709/205 |

(Continued)

FOREIGN PATENT DOCUMENTS

| | | | |
|---|---|---|---|
| EP | 2515263 | A1 | 10/2012 |
| EP | 2930670 | A1 | 10/2015 |
| EP | 4109287 | A1 | 12/2022 |

OTHER PUBLICATIONS

Martin Kleppmann; Local-first software: you own your data, in spite of the cloud; Onward! 2019: Proceedings of the 2019 ACM SIGPLAN International Symposium on New Ideas, New Paradigms, and Reflections on Programming and Software; pp. 1-25 (Year: 2019).*

*Primary Examiner* — Ann J Lo
*Assistant Examiner* — Jermaine A Mincey
(74) *Attorney, Agent, or Firm* — Perry + Currier In

(57) ABSTRACT

A device, system and method for obviating conflicts in database updates is provided. A computing device generates a local version of a central database file stored at a central database accessible by a plurality of computing devices, including the computing device, the central database file changeable by any of the plurality of computing devices, the local version comprising a copy of the central database file. After generating the local version, and in response to determining that a change has occurred to the central database file, as stored at the central database, the computing device: merges the local version and a current version of the central database file to generate a merged version of the central database file; and replaces, at the central database, the current version of the central database file with the merged version of the central database file.

20 Claims, 11 Drawing Sheets

(51) Int. Cl.

| | |
|---|---|
| ***G06F 16/23*** | (2019.01) |
| ***G06F 16/25*** | (2019.01) |

(56) References Cited

U.S. PATENT DOCUMENTS

| | | | | |
|---|---|---|---|---|
| 2019/0332699 | A1* | 10/2019 | Rittinger | G06F 16/252 |
| 2021/0200834 | A1 | 7/2021 | Adams et al. | |
| 2024/0274063 | A1* | 8/2024 | Hussell | H04B 10/00 |

* cited by examiner

DEVICE, SYSTEM AND METHOD FOR OBVIATING CONFLICTS IN DATABASE UPDATES

FIELD

The specification relates generally to obviating conflicts in database updates.

BACKGROUND

Central databases may store files that are accessible by a plurality of computing devices. However, more than one of the computing devices may attempt to update one central database file, which may lead to conflicts in the updates. In particular, data in the central database file may be lost when two computing devices about simultaneously attempt to make changes to the central database file, and each subsequently overwrite a current central database file with respective different versions.

SUMMARY

A first aspect of the specification provides a method comprising: generating, at a computing device, a local version of a central database file stored at a central database accessible by a plurality of computing devices, including the computing device, the central database file changeable by any of the plurality of computing devices, the local version comprising a copy of the central database file: after generating the local version, and in response to determining, at the computing device, that a change has occurred to the central database file, as stored at the central database: merging, at the computing device, the local version and a current version of the central database file to generate a merged version of the central database file; and replacing, via the computing device, at the central database, the current version of the central database file with the merged version of the central database file.

At the method of the first aspect, generating the local version of the central database file may comprise retrieving the copy of the central database file from the central database.

The method of the first aspect may further comprise, prior to the merging, altering the local version of the central database file by at least one of: one or more of changing, adding and deleting data at the local version of the central database file: one or more of changing, adding and deleting fields at the local version of the central database file; and one or more of changing, adding and deleting a structure of the local version of the central database file.

The method of the first aspect may further comprise, after the merging, altering the merged version of the central database file.

At the method of the first aspect, determining that the change has occurred to the central database file, as stored at the central database, may occur in response to altering the local version of the central database file.

At the method of the first aspect, determining that the change has occurred to the central database file, as stored at the central database, may occur in response to initiating one or more of storing and committing the local version of the central database file to the central database.

At the method of the first aspect, the merged version may comprise a mixture of respective data from the local version and the current version of the central database file.

At the method of the first aspect, merging the local version and the current version of the central database file to generate the merged version of the central database file may comprise: resolving conflicts between respective data from the local version and the current version of the central database file.

At the method of the first aspect, merging the local version and the current version of the central database file to generate the merged version of the central database file may comprise one or more of: changing same identifiers of respective data in the local version and the current version of the central database file to different identifiers in the local version; and copying, from the local and the current version to the merged version, identifiers of given data. For example, identifiers of given data are copied from the local version, to the merged version, and respective identifiers of respective given data that are new in the current version relative to the local version are copied from the current version, to the merged version.

The method of the first aspect may further comprise: after generating the local version, rendering, at a display screen, data from the local version; and in response to determining that the change has occurred to the central database file, as stored at the central database and in further response to retrieving the current version of the central database file: updating, at the display screen, the rendering of the local version to include respective data from the current version of the central database file.

The method of the first aspect may further comprise, prior to the merging: comparing the local version and the current version of the central database file; and responsive to the comparing: determining that the local version and the current version of the central database file are incompatible with being merged; and discarding the local version of the central database file in favor of the current version of the central database file such that the current version of the central database file becomes a new local version of the central database file.

At the method of the first aspect, the merging may comprise: replacing the local version of the central database file with the current version of the central database file.

A second aspect of the specification may provide a computing device comprising: a communication interface; and a controller configured to: generate a local version of a central database file stored at a central database accessible by a plurality of computing devices, including the computing device, the central database file changeable by any of the plurality of computing devices, the local version comprising a copy of the central database file: after generating the local version, and in response to determining that a change has occurred to the central database file, as stored at the central database: merge the local version and a current version of the central database file to generate a merged version of the central database file; and replace, via the communication interface, at the central database, the current version of the central database file with the merged version of the central database file.

At the computing device of the second aspect, the controller may be further configured to generate the local version of the central database file by retrieving the copy of the central database file from the central database.

At the computing device of the second aspect, the controller may be further configured to, prior to the merging, alter the local version of the central database file by at least one of: one or more of changing, adding and deleting data at the local version of the central database file: one or more of changing, adding and deleting fields at the local version of the central database file; and one or more of changing, adding and deleting a structure of the local version of the central database file.

At the computing device of the second aspect, the controller may be further configured to, after the merging, alter the merged version of the central database file.

At the computing device of the second aspect, the controller may be further configured to the change has occurred to the central database file, as stored at the central database, in response to altering the local version of the central database file.

At the computing device of the second aspect, the controller may be further configured to the change has occurred to the central database file, as stored at the central database, in response to initiating one or more of storing and committing the local version of the central database file to the central database.

At the computing device of the second aspect, the merged version may comprise a mixture of respective data from the local version and the current version of the central database file.

At the computing device of the second aspect, the controller may be further configured to merge the local version and the current version of the central database file to generate the merged version of the central database file by: resolving conflicts between respective data from the local version and the current version of the central database file.

At the computing device of the second aspect, the controller may be further configured to merge the local version and the current version of the central database file to generate the merged version of the central database file by one or more of: changing same identifiers of respective data in the local version and the current version of the central database file to different identifiers in the local version; and copying, from the local and the current version to the merged version, identifiers of given data. For example, identifiers of given data are copied from the local version, to the merged version, and respective identifiers of respective given data that are new in the current version relative to the local version are copied from the current version, to the merged version.

At the computing device of the second aspect, the controller may be further configured to: after generating the local version, render, at a display screen, data from the local version; and in response to determining that the change has occurred to the central database file, as stored at the central database and in further response to retrieving the current version of the central database file; update, at the display screen, the rendering of the local version to include respective data from the current version of the central database file.

At the computing device of the second aspect, the controller may be further configured to, prior to the merging: compare the local version and the current version of the central database file; and responsive to the comparing: determine that the local version and the current version of the central database file are incompatible with being merged; and discard the local version of the central database file in favor of the current version of the central database file such that the current version of the central database file becomes a new local version of the central database file.

At the computing device of the second aspect, the controller may be further configured to merge the local version and a current version of the central database file to generate the merged version of the central database file by: replacing the local version of the central database file with the current version of the central database file.

A third aspect of the present specification provides a non-transitory computer-readable medium storing a computer program, wherein execution of the computer program is to implement a method comprising: generating, at a computing device, a local version of a central database file stored at a central database accessible by a plurality of computing devices, including the computing device, the central database file changeable by any of the plurality of computing devices, the local version comprising a copy of the central database file: after generating the local version, and in response to determining, at the computing device, that a change has occurred to the central database file, as stored at the central database: merging, at the computing device, the local version and a current version of the central database file to generate a merged version of the central database file; and replacing, via the computing device, at the central database, the current version of the central database file with the merged version of the central database file.

At the method of the third aspect, generating the local version of the central database file may comprise retrieving the copy of the central database file from the central database.

The method of the third aspect may further comprise, prior to the merging, altering the local version of the central database file by at least one of: one or more of changing, adding and deleting data at the local version of the central database file: one or more of changing, adding and deleting fields at the local version of the central database file; and one or more of changing, adding and deleting a structure of the local version of the central database file.

The method of the third aspect may further comprise, after the merging, altering the merged version of the central database file.

At the method of the third aspect, determining that the change has occurred to the central database file, as stored at the central database, may occur in response to altering the local version of the central database file.

At the method of the third aspect, determining that the change has occurred to the central database file, as stored at the central database, may occur in response to initiating one or more of storing and committing the local version of the central database file to the central database.

At the method of the third aspect, the merged version may comprise a mixture of respective data from the local version and the current version of the central database file.

At the method of the third aspect, merging the local version and the current version of the central database file to generate the merged version of the central database file may comprise: resolving conflicts between respective data from the local version and the current version of the central database file.

At the method of the third aspect, merging the local version and the current version of the central database file to generate the merged version of the central database file may comprise one or more of: changing same identifiers of respective data in the local version and the current version of the central database file to different identifiers in the local version; and copying, from the local and the current version to the merged version, identifiers of given data. For example, identifiers of given data are copied from the local version, to the merged version, and respective identifiers of respective given data that are new in the current version relative to the local version are copied from the current version, to the merged version.

The method of the third aspect may further comprise: after generating the local version, rendering, at a display screen, data from the local version; and in response to determining that the change has occurred to the central database file, as stored at the central database and in further response to retrieving the current version of the central database file: updating, at the display screen, the rendering of the local version to include respective data from the current version of the central database file.

The method of the third aspect may further comprise, prior to the merging: comparing the local version and the current version of the central database file; and responsive to the comparing: determining that the local version and the current version of the central database file are incompatible with being merged; and discarding the local version of the central database file in favor of the current version of the central database file such that the current version of the central database file becomes a new local version of the central database file.

At the method of the third aspect, the merging may comprise: replacing the local version of the central database file with the current version of the central database file.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Central databases may store files that are accessible by a plurality of computing devices. However, more than one of the computing devices may attempt to update one central database file, which may lead to conflicts in the updates. In particular, data in the central database file may be lost when two computing devices about simultaneously attempt to make changes to the central database file, and each subsequently overwrite a current central database file with respective different versions.

For example, a first computing device may generate a local version of the central database file by retrieving a copy of the central database file from the central database. The first computing device may make a change to the local version of the central database file, and commit the changed local version back into the central database, by overwriting the central database file that is currently being stored in the central database with the changed local version, thereby updating the central database file.

However, after the first computing device has retrieved the copy of the central database file, but before the first computing device overwrites the central database file with the changed local version, a second computing device may generate a respective local version of the central database file by retrieving a respective copy thereof from the central database, make a change to the respective local version, and commit the changed respective local version file back into the central database, by overwriting the central database file with the respective local version, which becomes a current version of the central database file stored at the central database.

However, when the first computing device later commits its changed local version to the central database, the current version of the central database file, which contains the changes made by the second computing device, is overwritten, such that the changes made by the second computing device are lost.

Hence, the two computing devices may cause conflicts and/or loss of data in the updating of a central database file. Such conflicts and/or loss of data represent a significant technical challenge when updating databases.

Figure 1:
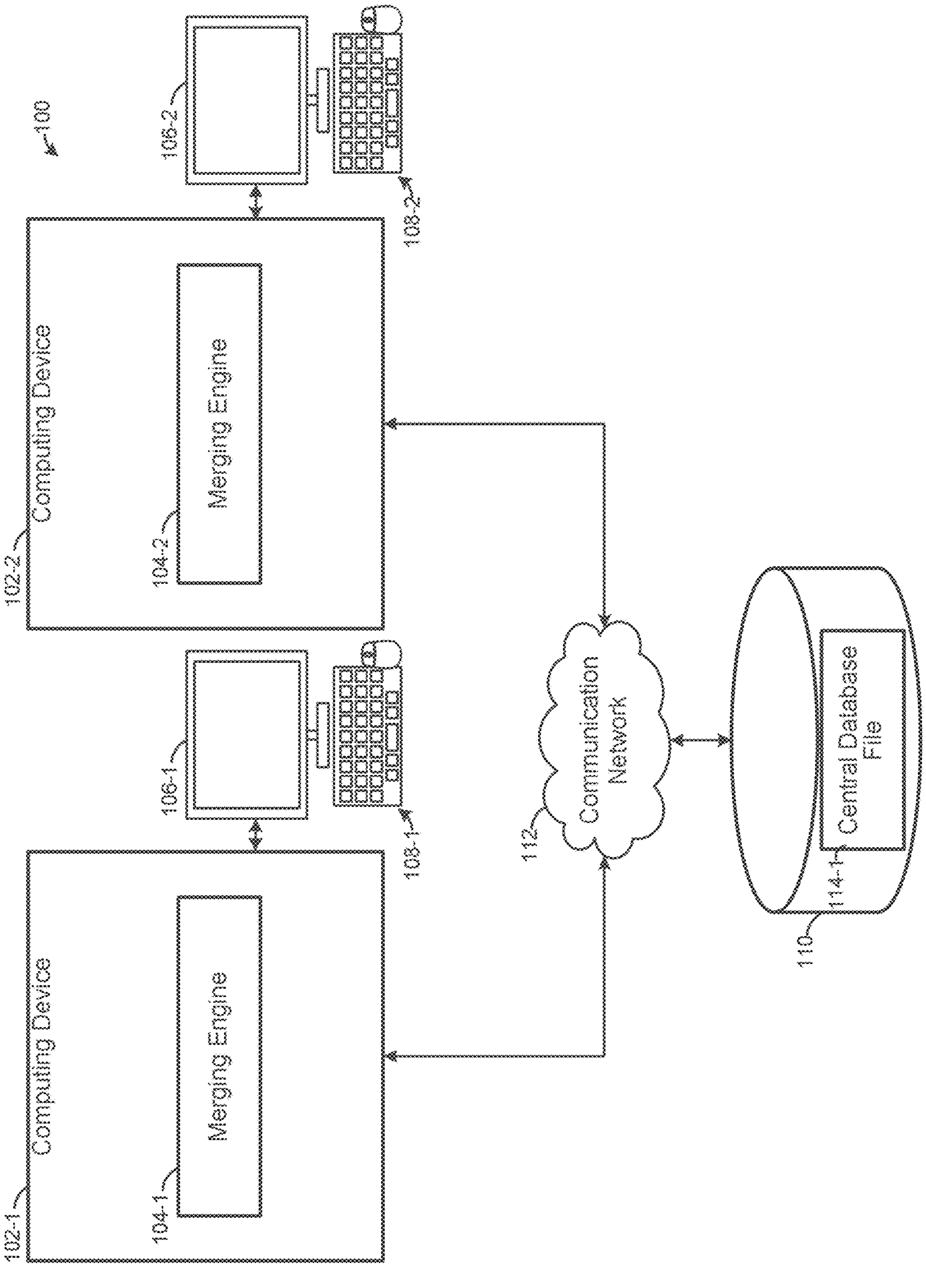
FIG. 1 depicts a system for obviating conflicts in database updates, according to non-limiting examples.

FIG. 1 depicts a system 100 for obviating conflicts in database updates which may mitigate and/or reduce at least a portion of the aforementioned technical challenges. The components of the system 100 are generally in communication via communication links which are depicted in FIG. 1, and throughout the present specification, as double-ended arrows between respective components. The communication links include any suitable combination of wireless and/or wired communication networks and, similarly, the communication links may include any suitable combination of wireless and/or wired links.

The system 100 will furthermore be described with respect to engines. As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc, as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory; or optical media such as a digital versatile disc (DVD), and/or implemented or interpreted by a processor), or hardware and software hosted at hardware.

In particular the system 100 comprises a plurality of computing devices 102-1, 102-2 that comprise respective merging engines 104-1, 104-2, as will be described herein. For simplicity; the plurality of computing devices 102-1, 102-2 are interchangeably referred to, herein, as the computing devices 102 and, generically; as a computing device 102. This convention will be used elsewhere in the present specification. For example, the merging engines 104-1, 104-2 are interchangeably referred to as the merging engines 104 and/or a merging engine 104.

While only two computing devices 102 are depicted, the system 100 may comprise any suitable number of computing devices 102, including tens, hundreds, thousands of computing devices 102, and the like, with a respective number of respective merging engines 104.

The computing devices 102 are in communication with respective display screens 106-1, 106-2 (e.g, display screens 106, and/or a display screen 106), and respective input devices 108-1, 108-2 (e.g. input devices 108, and/or an input device 108). The input devices 108 may comprise any suitable combination of a keyboard, a pointing device, a mouse, microphones (e.g, for receipt of aural commands input), and the like. While the display screens 106 and input devices 108 are depicted external to the computing devices 102, in other examples a display screen 106 and/or an input device 108 may be integrated into a computing device 102.

A computing device 102 may comprise any suitable combination of computing devices including, but not limited to, a personal computer, a laptop, a mobile device, a server, a cloud computing device, and the like. In some examples, a combination of a display screen 106 and an input device 108 may comprise a computer terminal used to access a respective computing device 102.

In particular, the plurality of computing devices 102 are generally configured to access a central database 110, for example via a communication network 112, which may comprise any suitable combination of wired and/or wireless communication networks, including, but not limited to, a cell phone networks, Wide Area Networks (WANs), the Internet, and the like.

As depicted, the central database 110 stores a central database file 114-1, which is accessible by the plurality of computing devices 102. Hence, as used herein, the terms "central database" and "central database file" are understood to respectively include a database and a file stored at the database, that are accessible by a plurality of computing devices, and such a file is changeable by the plurality of computing devices.

Hence, the central database file 114-1 is understood to be changeable by any of the plurality of computing devices 102. Furthermore, the central database file 114-1 may be stored in association with a timestamp, and the like, indicating a time (e.g, a date and time) that the central database file 114-1 was stored at the central database 110: such a timestamp may be stored as metadata at the central database file 114-1.

While only one central database file 114-1 is depicted for simplicity; the central database 110 may store hundreds to thousands to millions, or more central database files 114-1.

Furthermore, the central database file 114-1 is numbered with an extension of "–1" as it is understood that the central database file 114-1 is a first version and/or a presently stored version of the central database file 114-1. Put another way, the central database file 114-1 may be an original version or the central database file 114-1 have been stored at central database 110 at any given time, and previous versions of the central database file 114-1 may have existed. Put yet another way, the central database file 114-1 depicted in FIG. 1, may be a first and/or an original version of the central database file 114-1, and/or the central database file 114-1 depicted in FIG. 1, may be a current version of the central database file 114-1 and/or a currently stored version of the central database file 114-1. Later versions of the central database file 114-1, described herein, will be subsequently numbered as "–2", "–3", etc., as copies of the central database file 114-1 are generated and/or such later versions are updated at the central database 110.

For example, a first computing device 102-1 may generate a local version of the central database file 114-1 by retrieving a copy of the central database file 114-1 from the central database 110. The first computing device 102-1 may make a change to the local version of the central database file 114-1, and commit the changed local version back into the central database 110, by overwriting the central database file 114-1 that is currently being stored in the central database 110 with the changed local version, thereby updating the central database file 114-1. In some examples, when the central database file 114-1 is overwritten, the current version of the central database file 114-1 may include a timestamp, as metadata, indicating a time (e.g, a time and date) that the central database file 114-1 was overwritten and/or updated. The term "commit" and/or "committing" as used herein is understood to include storing changes made to a file by a computing device at a database, which may include overwriting a current version of the file at the database with a changed file generated by the computing device: furthermore, the term "overwriting" as used herein is understood to include storing changes made to a file by a computing device at a database, by deleting the current version of the file at the database and replacing with the changed file. Versions of the files may be identified via timestamps and/or version numbers, which may be stored in metadata of the files.

However, after the first computing device 102-1 has retrieved the copy of the central database file 114-1, but before the first computing device 102-1 overwrites the central database file 114-1 with the changed local version, a second computing device 102-2 may generate a respective local version of the central database file 114-1 by retrieving a respective copy thereof from the central database 110, make a change to the respective local version, and commit the changed respective local version file 114-1 back into the central database 110, overwriting the central database file 114-1 with the respective local version, which becomes a current version of the central database file 114-1 stored at the central database 110. In some examples, when the central database file 114-1 may be overwritten, the current version of the central database file 114-1 may include a timestamp, as metadata, indicating a time (e.g, a time and date) that the central database file 114-1 was overwritten and/or updated.

However, when the first computing device 102-1 later commits its changed local version to the central database 110, the current version of the central database file 114-1, which contains the changes made by the second computing device 102-2, is overwritten, such that the changes made by the second computing device 102-2 are lost.

Such a situation may be generically referred to as a collision at the central database 110, for example when two or more computing devices 102 overwrite the central database file 114-1 in such a manner such that information previously stored at the central database file 114-1 by another computing device 102 is lost.

While such a situation may be addressed by storing different versions of the central database file 114-1 at the central database 110, such different versions may contain different information, and a computing device 102 that later attempts to access the central database file 114-1 may not determine which version is current and/or most up to date, and/or which version of the central database file 114-1 has information relevant to the computing device 102 accessing the central database file 114-1 (which may or may not be a most recently stored version). Furthermore, storing different versions of the central database file 114-1 wastes storage space at the central database 110.

While such a situation may also be addressed by locking the central database file 114-1 when the central database file 114-1 is retrieved by a first computing device 102-1, for example until the first computing device 102-1 updates the central database file 114-1 at the central database 110, for example to prevent a second computing device 102-2 from accessing the central database file 114-1 until changes to the central database file 114-1 by the first computing device 102-1 are committed, in some situations the central database file 114-1 may be accessed tens to hundreds to thousands of times per day, and such locking may cause undue delays in data processing by the computing devices 102, and the like, in the system 100.

For example, in the context of the travel industry; the central database file 114-1 may comprise a passenger name record (PNR) which may include personal information provided by a passenger and/or a travel agency; and which may be accessed to change and/or add and/or delete one or more of travel dates, itineraries, seats, baggage, travel preferences, credit card numbers, and the like, for a passenger. Hence, the central database file 114-1 may be accessed to change entries in any suitable fields of the central database file 114-1, and/or to change and/or add and/or delete fields 114-1 at the central database file 114-1, for example using any of the computing devices 102, which may be operated by a passenger, one or more friends or relatives making travel plans for the passenger, one or more travel agents, one or more reservation sites, one or more provider systems and/or airlines, one or more intermediation servers (e.g. intermediating between client devices operated by passengers, travel agents, and the like, and provider systems and/or airlines), and the like. Indeed, while not depicted one or more of the computing devices 102 may be operated by one or more provider systems, operated by airlines, and/or any other entity which may provide provider objects and the like.

Provider objects, in the examples discussed herein, may comprise data records, and the like, which correspond to products and/or items and/or events, such as travel-related goods and services (e.g., flights, hotel reservations, car rentals and the like), provided by a provider system. More specifically; provider objects may define flight tickets, car rentals, hotel rentals, and related services (e.g., limo pickup services, excursions at a destination, baggage check services, in-flight food, entertainment, pet-related services, and the like). However, it is understood that the systems and methods discussed below can also be applied to various other types of data objects and/or items including, but not limited to, data objects that correspond to any suitable products and/or any suitable items available (e.g., for purchase, and the like) from any suitable website, and the like.

Regardless, in some examples, the central database file 114-1 may define criteria that may be used to generate provider objects, and/or aspects of provider objects 114-1 may be stored at the central database file 114-1 as a passenger name record. As such, the central database file 114-1 may be updated frequently and data may be lost due to the aforementioned collisions between computing devices 102.

Furthermore, it is understood that PNRs and/or travel industry examples described herein are not to be considered unduly limiting, and any suitable type of the central database file 114-1 is within the scope of the present specification. For example, the central database file 114-1 may include, but is not limited to, a medical record, a human resource record, an employment record, an employee record, and the like.

Regardless of a type of the file, the merging engines 104 are provided at the computing devices 102 which implement specific functionality to obviate the aforementioned collisions, and which will be described in more detail with respect to FIG. 3, FIG. 4, FIG. 5, FIG. 6, FIG. 7, and FIG. 8.

However, in general, a computing device 102 as provided herein, for example via a merging engine 104, is configured to generate a local version of the central database file 114-1, and, in response to determining that a change has occurred to the central database file 114-1, as stored at the central database 110, the computing device 102 merges the local version and the current version of the central database file 114-1 to generate an updated version of the central database file 114-1, which is used to replace, at the central database 110, the current version of the central database file 114-1 with the updated version of the central database file 114-1. The computing device 102 is hence understood to retrieve, from the central database 110, the current version of the central database file 114-1, which may occur before or after or in conjunction with determining that a change has occurred to the central database file 114-1, as will be described in more detail below.

Hence, when the first computing device 102-1 retrieves a copy of the central database file 114-1 to generate a local version thereof, and the second computing device 102-2 makes changes to the central database file 114-1, while the first computing device 102-1 is processing and/or changing the local version of the central database file 114-1, the first computing device 102-1 may query the central database 110 to determine whether the central database file 114-1 has changed since previously retrieved. Such changes may be determined via a timestamp associated with the central database file 114-1 at the database 114-1. For example, when a timestamp on the central database file 114-1 is later than a time that the central database file 114-1 was initially retrieved by the first computing device 102-1, the first computing device 102-1 may determine that the central database file 114-1 has changed.

In these examples, when the central database file 114-1 has changed, the first computing device 102-1 may retrieve the current version of the central database file 114-1 and merge the current version of the central database file 114-1 with the local version, thereby merging any changes to the central database file 114-1 made at the central database 110 with the local version of the central database file 114-1. The merged version of the central database file 114-1 may be committed to the central database 110 by the first computing device 102-1, by overwriting the current version of the central database file 114-1 with the merged version.

Figure 2:
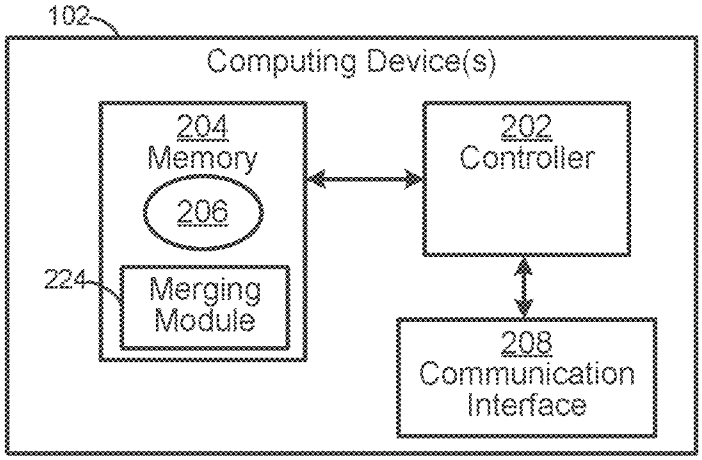
FIG. 2 depicts a device for obviating conflicts in database updates, according to non-limiting examples.

Turning to FIG. 2, before discussing the functionality of the system 100 in greater detail, certain components of a computing device 102 will be described. While depicted as one device, the computing device 102 may comprise one or more computing devices and/or one or more servers and/or one or more cloud computing devices that may be geographically distributed, and/or the computing device 102 may comprise a personal computer, a laptop, mobile device, a computer terminal, and the like. It is understood that both the first computing device 102-1 and the second computing device 102-2, and indeed any of the plurality of computing devices 102 of the system 100, may include the structure of the computing device 102 depicted in FIG. 2.

Alternatively, and/or in addition, determining that a change has occurred to the central database file 114-1 may occur by retrieving a version number of a current version central database file 114-1 as stored at the central database 110, and comparing the version number with a version number of the central database file 114-1 used to generate the local version of the central database file 114-1.

Alternatively; and/or in addition, determining that a change has occurred to the central database file 114-1 may occur by retrieving a hash of a current version central database file 114-1 as stored at the central database 110, and comparing the hash with a hash of the central database file 114-1 used to generate the local version of the central database file 114-1.

Alternatively, and/or in addition, determining that a change has occurred to the central database file 114-1 may occur by retrieving a current version of the central database file 114-1 from the central database 110 and comparing with the local version.

As shown in FIG. 2, the computing device 102 includes at least one controller 202, such as a central processing unit (CPU) or the like. The controller 202 is interconnected with a memory 204 storing an application 206, the memory 204 implemented as a suitable non-transitory computer-readable medium (e.g, a suitable combination of non-volatile and volatile memory subsystems including any one or more of Random Access Memory (RAM), read only memory (ROM), Electrically Erasable Programmable Read Only Memory (EEPROM), flash memory; magnetic computer storage, and the like). The controller 202 and the memory 204 are generally comprised of one or more integrated circuits (ICs).

The controller 202 is also interconnected with a communication interface 208, which enables the computing device 102 to communicate with the other components of the system 100, for example via the communication network 112. The communication interface 208 therefore may include any suitable components (e.g. network interface controllers (NICs), radio units, and the like) to communicate via a network, such as the communication network 112. The specific components of the communication interface 208 may be selected based upon the nature of a network used to communicate, and/or local communication between components of the system 100, and the like.

While not depicted in FIG. 2, the computing device 102 can also include input and output devices connected to the controller 202, such as keyboards, mice, display screens, and the like (not shown) but which may include, but are not limited to, a display screen 106 and an input device 108.

The components of the computing device 102 mentioned above can be deployed in a single enclosure, or in a distributed format. In some examples, therefore, the computing device 102 may include a plurality of processors, either sharing the memory 204 and communication interface 208, or each having distinct associated memories and communication interfaces. As such, it is understood that the memory 204, and/or a portion of the memory 204, may be internal (e.g, as depicted) or external to the computing device 102: regardless, the controller 202 is understood to have access to the memory 204.

The memory 204 also stores computer-readable programming instructions, executable by the controller 202, in the form of various applications, including the application 206. As will be understood by those skilled in the art, the controller 202 executes the instructions of the application 206 (and any other suitable applications) in order to perform various actions defined by the instructions contained therein including, but not limited to, the blocks of a method described with respect to FIG. 3. In the description below, the controller 202, and more generally the computing device 102, are said to be configured to perform those actions. It will be understood that they are so configured via the execution (by the controller 202) of the instructions of the applications stored in memory 204.

As depicted, the memory 204 further stores a merging module 224 which comprises computer-readable programming instructions for implementing a merging engine 104, for example when processed by the controller 202. While the merging module 224 is depicted as being separate from the application 206, in other examples the merging module 224 may be a component of the application 206.

Figure 3:
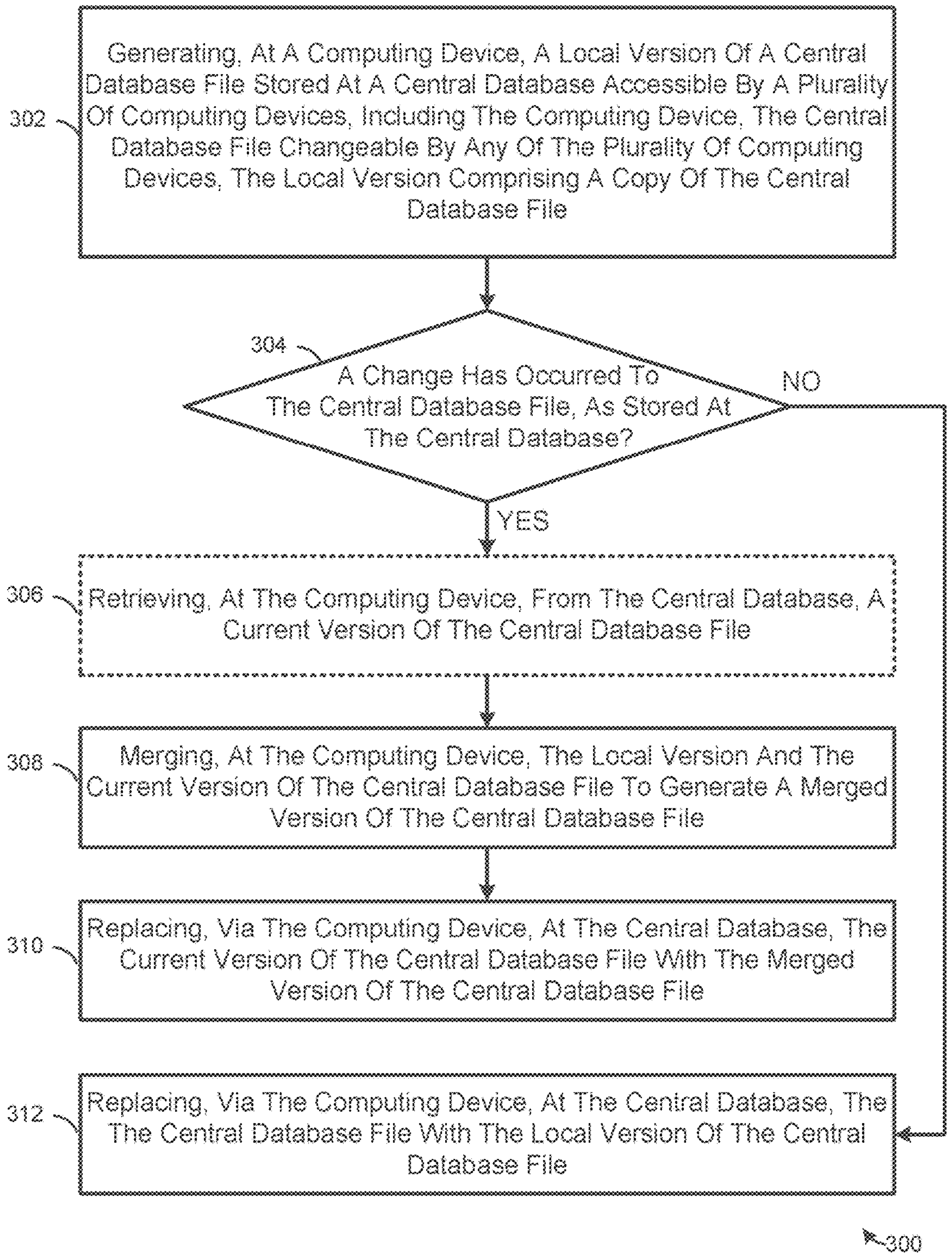
FIG. 3 depicts a flowchart of a method for obviating conflicts in database updates, according to non-limiting examples.

Attention is now directed to FIG. 3 which depicts a flowchart representative of a method 300 for obviating conflicts in database updates. The operations of the method 300 of FIG. 3 correspond to machine readable instructions that are executed by a computing device 102, and specifically a controller 202 of a computing devices 102. In the illustrated example, the instructions represented by the blocks of FIG. 3 are stored at the memory 204 for example, as the application 206 and/or the merging module 224. The method 300 of FIG. 3 is one way in which the controller 202 and/or the computing devices 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100, as well.

Furthermore, while the method 300 is generally described with respect to the controller 202 and/or a computing device 102 implementing the method 300, it is understood that portions of the method 300 may be performed by all of the computing devices 102 and/or respective controllers 202 and/or merging engines 104 thereof.

In particular, the method 300 is generally described with respect to a controller 202 of the first computing device 102-1 implementing the method 300, however, a controller 202 of the second computing device 102-2 may also be implementing the method 300.

Furthermore, while in the description of the method 300, versions of the central database file 114-1 are described with respect to an extension "–1" it is understood that the versions may change, and such changes are described with respect to examples of FIG. 4, FIG. 5, FIG. 6, FIG. 7, and FIG. 8.

At a block 302, the controller 202 and/or the first computing device 102-1, generates a local version of the central database file 114-1 stored at a central database accessible by a plurality of computing devices, including the computing device, the central database file 114-1 changeable by any of the plurality of computing devices, the local version comprising a copy of the central database file 114-1.

In some examples, generating the local version of the central database file 114-1 may comprise retrieving the copy of the central database file 114-1 from the central database 110, for example using any suitable database process. Indeed, any suitable process for generating the local version of the central database file 114-1 is within the scope of the present specification. For example, the first computing device 102-1 may have access to a cache that stores a version of the central database file 114-1 that was previously generated, and such a cache may be different from the central database 110.

Alternatively, and/or in addition, the local version of the central database file 114-1 may be generated at the first computing device 102-1 (or the second computing device 102-2), stored in a cache, and committed to the central database 110 to generate the central database file 114-1. Put another way, generating the local version of the central database file 114-1 may comprise generating the local version of the central database file 114-1 at the first computing device 102-1 prior to committing the local version of the central database file 114-1 to the central database 110, as the central database file 114-1.

In a particular example, the input device 108-1 may be operated to retrieve a copy of the central database file 114-1 for example when the first computing device 102-1 is implementing an application to update and/or edit the central database file 114-1, for example in conjunction with updating a PNR of the central database file 114-1.

In another particular example, the input device 108-1 may be operated to generate the local version of the central database file 114-1 for example when the first computing device 102-1 is implementing an application to generate the central database file 114-1, for example in conjunction with generating a PNR of the central database file 114-1, and the local version of the central database file 114-1 may be committed to the central database 110.

At a block 304, after generating the local version of the central database file 114-1, the controller 202, the first computing device 102-1 determines whether a change has occurred to the central database file 114-1, as stored at the central database 110.

In some examples, determining whether a change has occurred to the central database file 114-1, as stored at the central database 110, may occur in response to altering the local version of the central database file 114-1.

For example, the method 300 may include (e.g. prior to a merging process, described in more detail below), the controller 202 and/or the first computing device 102-1 altering the local version of the central database file 114-1 in any suitable manner. For example, the controller 202 and/or the first computing device 102-1 may one or more of change, add and delete data at the local version of the central database file 114-1. Alternatively, and/or in addition, the controller 202 and/or the first computing device 102-1 may one or more of change, add and delete fields at the local version of the central database file 114-1. Alternatively, and/or in addition, the controller 202 and/or the first computing device 102-1 may one or more of change, add and delete a structure of the local version of the central database file 114-1. For example, data associated with a travel itinerary may be changed and/or added and/or deleted at the local version of the central database file 114-1, such as dates of travel, origin and destination airports, and the like. A credit card field may be added and populated, and the like, at the local version of the central database file 114-1. A field may be moved at the local version of the central database file 114-1, for example to change a structure of the local version of the central database file 114-1. Such changes may occur via a user of the first computing device 102-1 editing the local version of the central database file 114-1 via the display screen 106-1 and the input device 108-1, and the like.

In other examples, determining whether a change has occurred to the central database file 114-1, as stored at the central database 110, may occur in response to initiating one or more of storing and committing the local version of the central database file 114-1 to the central database 110. Hence, when a user of the first computing device 102-1 is finished editing the local version of the central database file 114-1, the user may actuate a "save" button (e.g, an electronic save button provided at the display screen 106-1), and the like, via the input device 108-1, to save the changes made to the local version of the central database file 114-1 at the central database 110.

Regardless, determining whether a change has occurred to the central database file 114-1, as stored at the central database 110 occurs prior to overwriting the central database file 114-1 with the local version.

Furthermore, determining that a change has occurred to the central database file 114-1 may occur by retrieving a timestamp of a current version of the central database file 114-1 as stored at the central database 110, and comparing the timestamp with a timestamp of the central database file 114-1 used to generate the local version of the central database file 114-1 at the block 302. For example, the local version of the central database file 114-1 generated at the block 302 is understood to be based on some version of the central database file 114-1 that may be timestamped to indicate when that version of the central database file 114-1 at the block 302 was generated, and/or the local version of the central database file 114-1 may be timestamped with a time (e.g, a time and date) that the local version was generated. As such, to determine whether the central database file 114-1 has changed at the central database 110, since the local version of the central database file 114-1 was generated, respective timestamps associated with the local version of the central database file 114-1 and a current version of the central database file 114-1 may be compared. When the timestamp associated with the local version of the central database file 114-1 is prior to the respective timestamp associated with the current version of the central database file 114-1 stored at the central database 110, the controller 202 and/or the first computing device 102-1 may determine that the current version of the central database file 114-1 stored at the central database 110 has changed since the local version of the central database file 114-1 was generated.

Alternatively, and/or in addition, determining that a change has occurred to the central database file 114-1 may occur by retrieving a version number of a current version of the central database file 114-1 as stored at the central database 110, and comparing the version number with a version number of the central database file 114-1 used to generate the local version of the central database file 114-1 at the block 302. For example, the local version of the central database file 114-1 generated at the block 302 is understood to be based on some version of the central database file 114-1 that may be identified by a version number which may indicate when that version of the central database file 114-1 at the block 302 was generated, and/or the local version of the central database file 114-1 may be identified with a respective version number indicative of when the local version was generated. As such, to determine whether the central database file 114-1 has changed at the central database 110, since the local version of the central database file 114-1 was generated, respective version numbers associated with the local version of the central database file 114-1 and a current version of the central database file 114-1 may be compared. When the version number associated with the local version of the central database file 114-1 is different from the respective version number associated with the current version of the central database file 114-1 stored at the central database 110, the controller 202 and/or the first computing device 102-1 may determine that the current version of the central database file 114-1 stored at the central database 110 has changed since the local version of the central database file 114-1 was generated.

Alternatively, and/or in addition, hash techniques may be used to determine that a change has occurred to the central database file 114-1. For example, a hash of the central database file 114-1 may be stored as metadata with the central database file 114-1, and when the central database file 114-1 is changed at the central database 114-1, such a hash may be updated. Similarly, the first computing device 102-1 may determine a respective hash of the copy of the central database file 114-1 used to generate the local version of the central database file 114-1, for example by applying a hash algorithm and/or by accessing the respective hash in the metadata of the copy of the central database file 114-1. Regardless, hashes may be used to determine whether the copy of the central database file 114-1 used to generate the local version of the central database file 114-1 is the same as, or different from, a current version of the central database file 114-1 stored in the central database 110. Examples of hash algorithms may include, but are not limited to. Secure Hash Algorithms (SHA), and the like, amongst other possibilities.

Hence, determining whether a change has occurred to the central database file 114-1 may occur by the controller 202 and/or the first computing device 102-1 requesting metadata associated with the current version of the central database file 114-1 from the central database 110, and/or by the controller 202 and/or the first computing device 102-1 requesting the current version of the central database file 114-1 from the central database 110, which may include the metadata.

Alternatively, and/or in addition, determining that a change has occurred to the central database file 114-1 may occur by retrieving a current version of the central database file 114-1 from the central database 110, and comparing the current version of the central database file 114-1 as retrieved, with the copy of the central database file 114-1 used to generate the local version of the central database file 114-1. In these examples, the first computing device 102-1 is understood to maintain both the local version of the central database file 114-1, which may be altered as described above, and an unaltered copy of the central database file 114-1 used to generate the local version of the central database file 114-1 so that comparisons may be made with a retrieved current version of the central database file 114-1.

However, determining whether a change has occurred to the central database file 114-1 may occur in any suitable manner, though use of timestamps and/or version numbers and/or hashes is understood to use less bandwidth and processing power than a retrieval of a current version of the central database file 114-1.

It is further understood that the central database file 114-1 may have been changed at the central database 110 by the second computing device 102-2 and/or any other computing device 102 of the system 100.

In response to determining that a change has occurred to the central database file 114-1, as stored at the central database 110 (e.g, a "YES" decision at the block 304), the controller 202 and/or the first computing device 102-1 is understood to implement a block 308 and a block 310, and a block 306 may also be implemented when a current version of the central database file 114-1 has not been previously retrieved (e.g, to determine whether changes have occurred to the central database file 114-1 described with respect to the block 304).

In particular, in response to determining that a change has occurred to the central database file 114-1, as stored at the central database 110, and when a current version of the central database file 114-1 has not been previously retrieved, at a block 306, the controller 202 and/or the first computing device 102-1 retrieves, from the central database 110, the current version of the central database file 114-1, for example by requesting the current version of the central database file 114-1 using any suitable database process. However, the block 306 may occur prior to the block 304 and/or in conjunction with the block 304 (e.g, and not in response to a "YES" decision at the block 304).

At a block 308, the controller 202 and/or the first computing device 102-1 merges the local version and the current version of the central database file 114-1 to generate a merged version of the central database file 114-1. Such merging will be described in more detail below, however it is understood that the merged version may include data from both the local version and the current version of the central database file 114-1. Put another way, such merging may occur such that data that is in the current version of the central database file 114-1 is merged into, and/or incorporated into the local version of the central database file 114-1, such that data from both the current version of the central database file and the local version of the central database file 114-1 is in the merged version. Put yet another way; such merging may occur such that data is not lost from both the current version of the central database file and the local version of the central database file 114-1. Put yet another way, the merged version comprises a mixture of respective data from the local version and the current version of the central database file 114-1 (e.g, the merged version does not include multiple local versions and/or multiple central versions and/or the merged version does not include older copies of local versions and/or central versions of the central database file 114-1).

In particular, the controller 202 and/or the first computing device 102-1 may generally identify which fields are similar and different at the local version and the current version of the central database file 114-1, and combine the local version and the current version of the central database file 114-1 to include the same fields and the different fields and respective data therefrom.

However, any suitable merging process is within the scope of the present specification, including, but not limited to using one or more machine learning algorithms trained to perform merging. In these examples, a merging engine 104 and/or the application 206 may include such one or more machine learning algorithms trained to perform merging.

At a block 310, the controller 202 and/or the first computing device 102-1 replaces, at the central database 110, the current version of the central database file 114-1 with the merged version of the central database file 114-1. For example, the controller 202 and/or the first computing device 102-1 may commit the merged version of the central database file 114-1 to the central database 110, overwriting the current version of the central database file 114-1 with the merged version. The block 310 may occur via a communication interface 208 of the first computing device 102-1.

Returning briefly to the block 304, in response to determining that a change has not occurred to the central database file 114-1, as stored at the central database 110 (e.g, a "NO" decision at the block 304), the controller 202 and/or the first computing device 102-1, at a block 312, replaces, at the central database 110, the current version of the central database file 114-1 with the local version of the central database file 114-1. The block 312 may occur via a communication interface 208 of the first computing device 102-1. For example, the merging of the block 308 may not occur, and the controller 202 and/or the first computing device 102-1 may commit the local version of the central database file 114-1 to the central database 110, overwriting the current version of the central database file 114-1 with the local version. Put another way, a "NO" decision at the block 304 indicates that the central database file 114-1 has not been changed by another computing device 102, since the local version of the central database file 114-1 was generated. For example, such a determination may occur when timestamps and/or version numbers and/or hashes of the current version of the central database file 114-1 and the local version of the central database file 114-1 are the same.

The method 300 may include further aspects.

For example, the method 300 may further comprise the controller 202 and/or the first computing device 102-1, after the merging at the block 308, and prior to the replacing at the block 310, altering the merged version of the central database file 114-1, similar to how the local version of the central database file 114-1 may be altered, as described above. Put another way, the merged version of the central database file 114-1 may be changed via the display screen 106-1 and the input device 108-1, by changing, adding and/or deleting data at the merged version, and/or by changing, adding and/or deleting fields at the merged version of the central database file, and/or changing, adding and/or deleting a structure of the merged version of the central database file.

In further examples, merging the local version and the current version of the central database file 114-1, to generate the merged version of the central database file 114-1, may comprise the controller 202 and/or the first computing device 102-1 resolving conflicts between respective data from the local version and the current version of the central database file 114-1.

For example, the local version may indicate that a flight has not yet been paid for, and the current version of the central database file 114-1 may indicate that the flight has been paid for. In these examples, the controller 202 and/or the computing devices 102-1 may update, at the merged version, any suitable data to indicate that the flight has been paid for.

However, resolving any suitable types of conflicts is within the scope of the present specification. For example, a user of the second computing device 102-2 may edit the central database file 114-1 to modify a flight (e.g, to select and pay for a different class of ticket), and the local version of the central database file 114-1 at the first computing device 102-2 may indicate not indicate such modifications to the flight. In these examples, the controller 202 and/or the computing devices 102-1 may update, at the merged version, any suitable data to indicate the modifications to the flight (e.g, to change the class of ticket and to indicate that the different class of ticket has been paid for).

In yet further examples, other conflicts that may be resolved include, but are not limited to:

- Resolving hotel bookings. For example, the local version may indicate no hotel has been booked, while the central database file 114-1 may indicate that a hotel is booked. In these examples, the controller 202 and/or the computing devices 102-1 may update, at the merged version, any suitable data to indicate that a hotel has been booked.
- Resolving contact information. For example, the local version may indicate a first contact email address, while the central database file 114-1 may indicate that a second contact email address. In these examples, the controller 202 and/or the computing devices 102-1 may update, at the merged version, any suitable data to indicate both the first contact email address and the second contact email address.
- Resolving date cancellation information (e.g. resolving an Option Cancellation (OPC) element). For example, the local version may indicate that a flight has been booked, but not yet paid for, while the central database file 114-1 may indicate that the flight has been booked, not yet paid for, and a date by which payment must be made to prevent cancellation of the flight booking. Such a date may be a component of an OPC element that has been added to the central database file 114-1, but not the local version of the central database file 114-1. In these examples, the controller 202 and/or the computing devices 102-1 may update, at the merged version, any suitable data to indicate the date by which payment must be made to prevent cancellation of the flight booking, and/or add the OPC element to the merged version.

However, it is understood that such conflicts that may be resolved are merely examples, and any other conflicts that may be resolved are within the scope of the present specification.

In these examples, a merging engine 104 and/or the application 206 may include such one or more machine learning algorithms trained to perform resolving of conflicts.

In further examples, merging the local version and the current version of the central database file 114-1 to generate the merged version of the central database file 114-1 may comprise the controller 202 and/or the first computing device 102-1 changing same identifiers of respective data in the local version and the current version of the central database file 114-1 to different identifiers in the local version.

For example, particular respective fields storing respective data may be numbered in each of the local version and the current version of the central database file 114-1, and when new fields are added to each of the local version and the current version of the central database file 114-1, a computing device 102 performing the addition may number the new fields accordingly, for example to be respectively consecutive with existing numbered fields. Hence, in the local version and the current version of the central database file 114-1 two different fields may be identified using a same number (e.g, there may be two fields numbered as "7"); as such, the controller 202 and/or the first computing device 102-1 may change same identifiers of respective data in the local version and the current version of the central database file 114-1 to different identifiers in the local version, which may be consecutive with each other (e.g, one field may remain numbered as "7" in the current version of the central database file 114-1, and the other field initially numbered as "7" may be renumbered as "8" in the local version, and the like). However, any suitable identifiers are within the scope of the present specification.

Alternatively, and/or in addition, merging the local version and the current version of the central database file 114-1 to generate the merged version of the central database file 114-1 may comprise the controller 202 and/or the first computing device 102-1 copying, from the local 114-2 and the current version to the merged version 114-4, identifiers of given data. For example, identifiers of given data are copied from the local version, to the merged version, and respective identifiers of respective given data that are new in the current version relative to the local version are copied from the current version, to the merged version. Put another way, identifiers from each of the local version and the current version of the central database file 114-1 that are unique to each, are copied to the merged version along with the respective data being identified.

In yet further examples, the method 300 may further comprise, the controller 202 and/or the first computing device 102-1, after generating the local version (e.g, at the block 302): rendering, at the display screen 106-1, data from the local version; and in response to determining that the change has occurred to the central database file 114-1, as stored at the central database 110 (e.g, a "YES" decision at the block 304), and in further response to retrieving the current version of the central database file 114-1 (e.g, at the block 304 and/or the block 306): updating, at the display screen 106-1, the rendering of the local version to include respective data from the current version of the central database file 114-1. Put another way, initially the local version of the central database file 114-1 may be rendered at the display screen 106-1, and the input device 108-1 may be used to edit and/or change the local version of the central database file 114): when the current version of the central database file 114-1 is retrieved, the display screen 106-1 may be updated to include respective data from the current version of the central database file 114-1, for example that is not already in the local version of the central database file 114-1. Furthermore, suggestions for resolving conflicts may be shown at the display screen 106-1 (e.g, two date formats and/or different versions of names) and the input device 108-1 may be used to select the suggestions (e.g., such as selection of one date format over another, and/or selection of one name over another), however, in some examples such selection may occur automatically and/or without showing the suggestions at the display screen 106-1.

In yet further examples, the method 300 may further comprise, the controller 202 and/or the first computing device 102-1, after generating the merged version of the central database file 114-1 (e.g, at the block 310), updating, at the display screen 106-1, the rendering of the local version to render the merged version of the central database file 114-1.

In yet further examples, the method 300 may further comprise, the controller 202 and/or the first computing device 102-1, prior to the merging (e.g. prior to the block 310): comparing the local version and the current version of the central database file 114; and responsive to the comparing: determining that the local version and the current version of the central database file 114-1 are incompatible with being merged; and discarding the local version of the central database file 114-1 in favor of the current version of the central database file 114-1, such that the current version of the central database file 114-1 becomes a new local version of the central database file 114-1 at the first computing device 102-1.

For example, the second computing device 102-2 may have made extensive changes to the data and/or fields and/or structure of a respective local version of the central database file 114-1 before saving the respective local version as the current version of the central database file 114-1 at the central database 110. As such, the merging may not be possible and/or the local version and the current version of the central database file 114-1 are incompatible with being merged: for example, the controller 202 and/or the first computing device 102-1 may not be able to identify which data fields are similar and different at the local version and the current version of the central database file 114-1.

As such, the controller 202 and/or the first computing device 102-1 may implement the block 308 by discarding the data and/or the fields of the local version of the central database file 114-1 and replace with the data and/or the fields of the current version of the central database file 114-1 that has been retrieved.

Put another way, in some of these examples, the merging of the block 308 may comprise: replacing the local version of the central database file 114-1 with the current version of the central database file 114-1.

In some these examples, a threshold-based system may be used to determine whether the local version and the current version of the central database file 114 are compatible with merging. For example, the controller 202 and/or the first computing device 102-1 may perform a comparison between the local version of the central database file 114-1 and the current version of the central database file 114-1 and determine a percentage of fields that match and/or are the same. When the percentage of fields is below a threshold percentage, such as 70%, 80%, 90%, amongst other possibilities, the controller 202 and/or the first computing device 102-1 may determine that the local version and the current version of the central database file 114-1 are incompatible with being merged.

In these examples, a merging engine 104 and/or the application 206 may include such one or more machine learning algorithms trained to determine whether files are incompatible with merging.

Attention is next directed to FIG. 4, FIG. 5, FIG. 6, FIG. 7 and FIG. 8 which depict an example of the method 300. FIG. 4, FIG. 5, FIG. 6, FIG. 7 and FIG. 8 are substantially similar to FIG. 1, with like components having like numbers. It is understood in FIG. 4, FIG. 5, FIG. 6, FIG. 7 and FIG. 8 that both the computing devices 102-1, 102-2 are implementing the method 300. While for simplicity the merging engines 104 are not depicted in FIG. 4, FIG. 5, FIG. 6, FIG. 7 and FIG. 8, they are nonetheless understood to be present.

Figure 4:
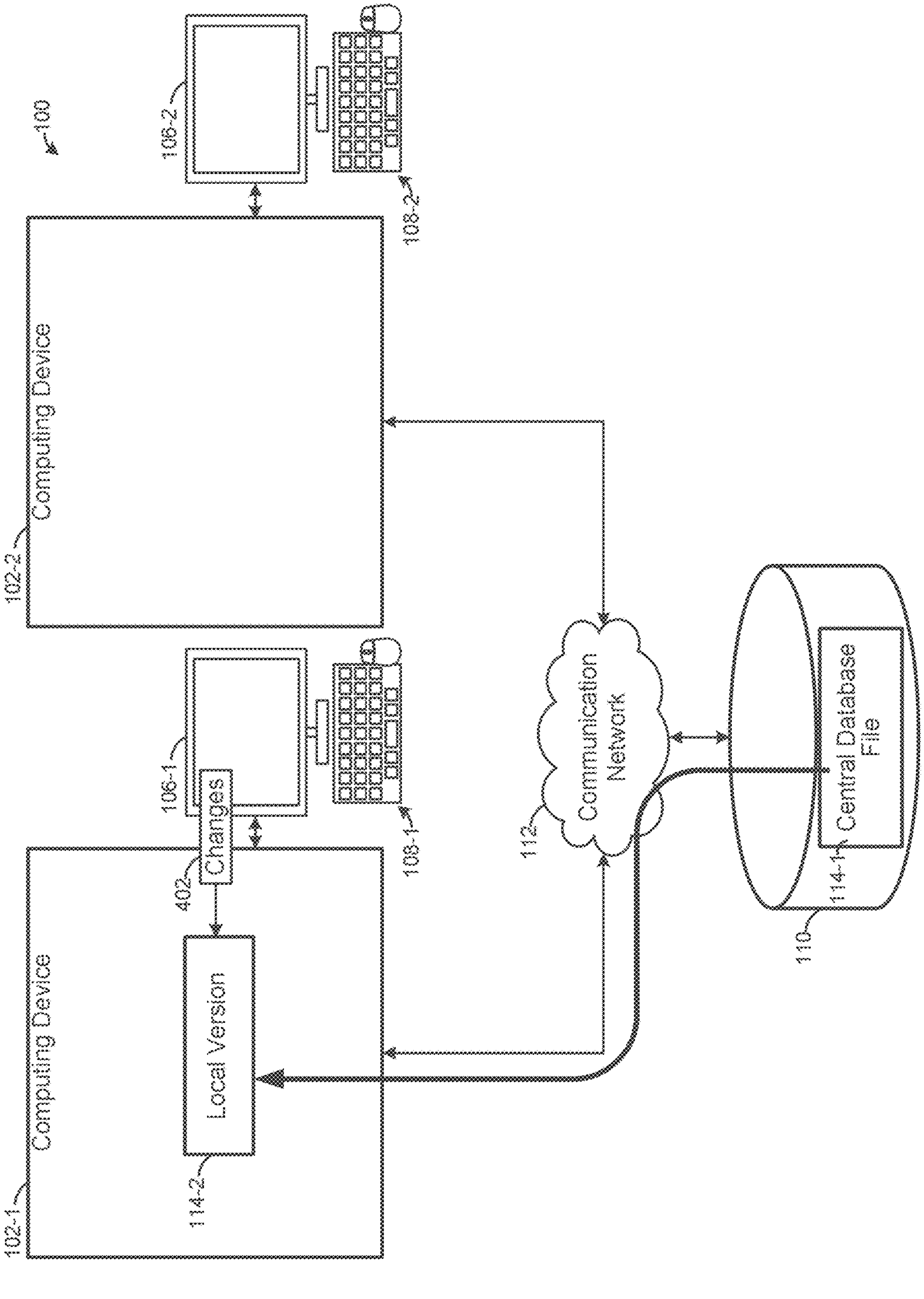
FIG. 4 depicts the system of FIG. 1 implementing aspects of a method for obviating conflicts in database updates, according to non-limiting examples.

With attention first directed to FIG. 4, the first computing device 102-1 generates (e.g, at the block 302 of the method 300), a local version 114-2 (e.g, a second version) of the central database file 114-1, for example by retrieving a copy of the central database file 114-1 from the central database 110. As depicted, the input device 106-1 may be used to make changes 402 to the local version 114-2 at the second computing device 102-2.

Figure 5:
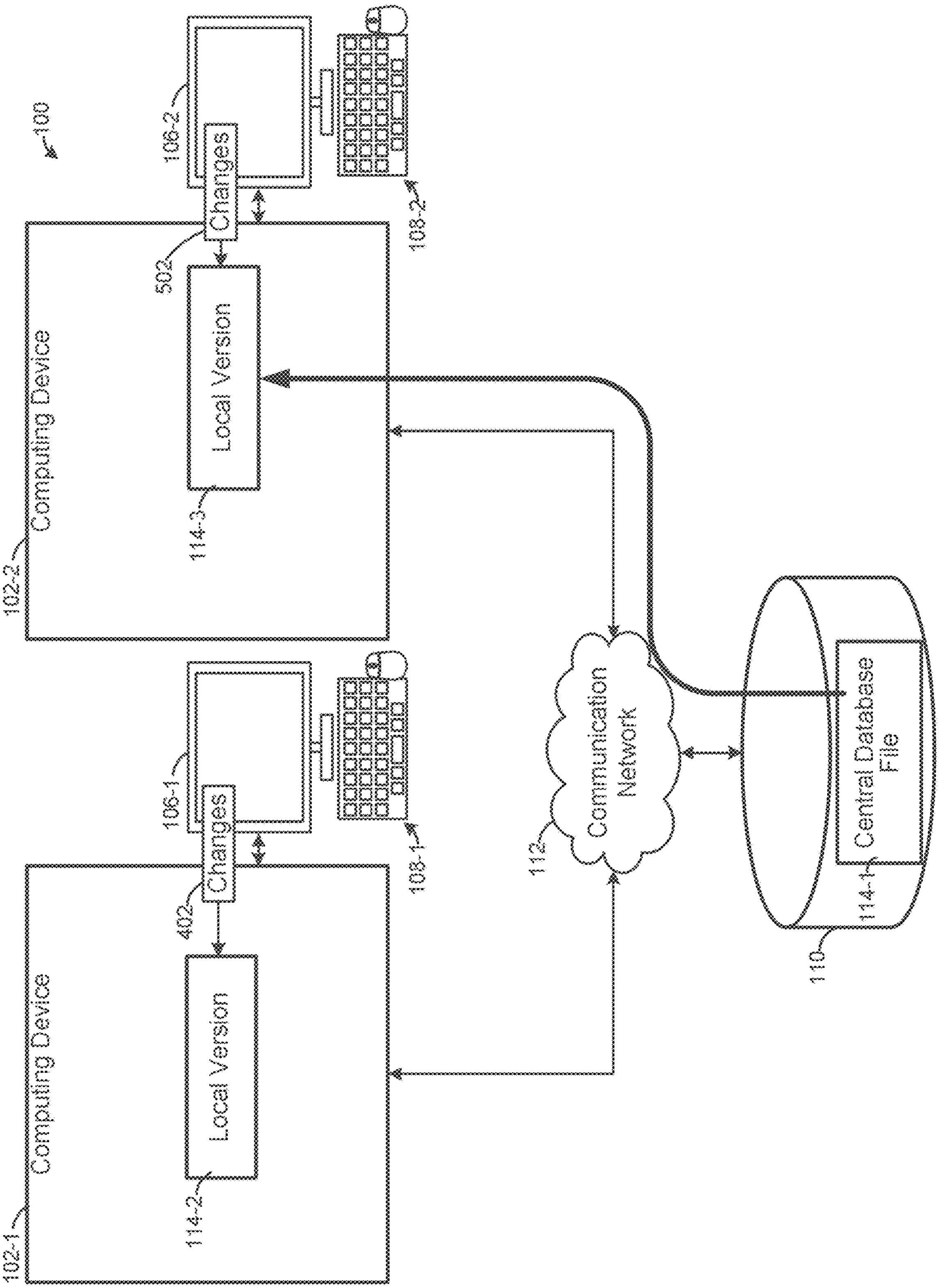
FIG. 5 depicts the system of FIG. 1 implementing further aspects of the method for obviating conflicts in database updates, according to non-limiting examples.

With attention next directed to FIG. 5, while the changes 402 are being made to the local version 114-2 at the first computing device 102-1, the second computing device 102-2 generates (e.g, at the block 302 of the method 300) a respective local version 114-3 (e.g, a third version) of the central database file 114-1, for example by retrieving a respective copy of the central database file 114-1 from the central database 110. As depicted, the input device 106-2 may be used to make changes 502 to the respective local version 114-3 at the second computing device 102-2.

Figure 6:
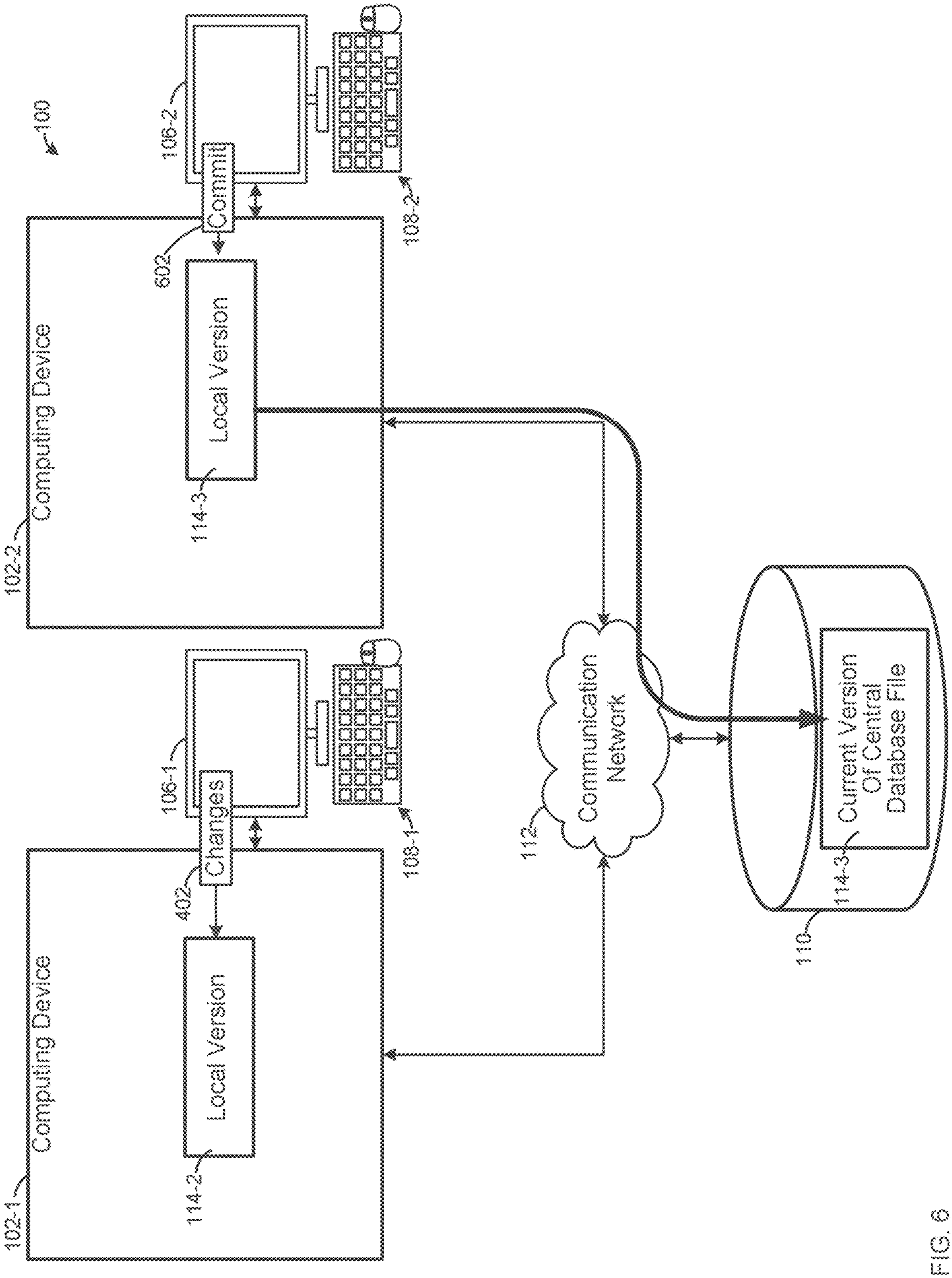
FIG. 6 depicts the system of FIG. 1 implementing further aspects of the method for obviating conflicts in database updates, according to non-limiting examples.

With attention next directed to FIG. 6, the second computing device 102-2 receives a command 602, via the input device 106-2, to commit the respective local version 114-3 of the central database file 114-1 to the central database 110, and the second computing device 102-2 overwrites the central database file 114-1 with the respective local version 114-3, such that the central database file 114-1 is changed to the respective local version 114-3, which is hereafter interchangeably referred to as the current version 114-3. While not depicted, prior to committing the respective local version 114-3 of the central database file 114-1 to the central database 110, the second computing device 104-2 may perform the block 304 of the method 300 and determine that no changes have been made to the central database file 114-1 (e.g, a "NO" decision at the block 304 of the method 300). As such, the second computing device 102-2 does not perform any merging of the block 308, and FIG. 6 represents an implementation of the block 312 of the method 300.

Figure 7:
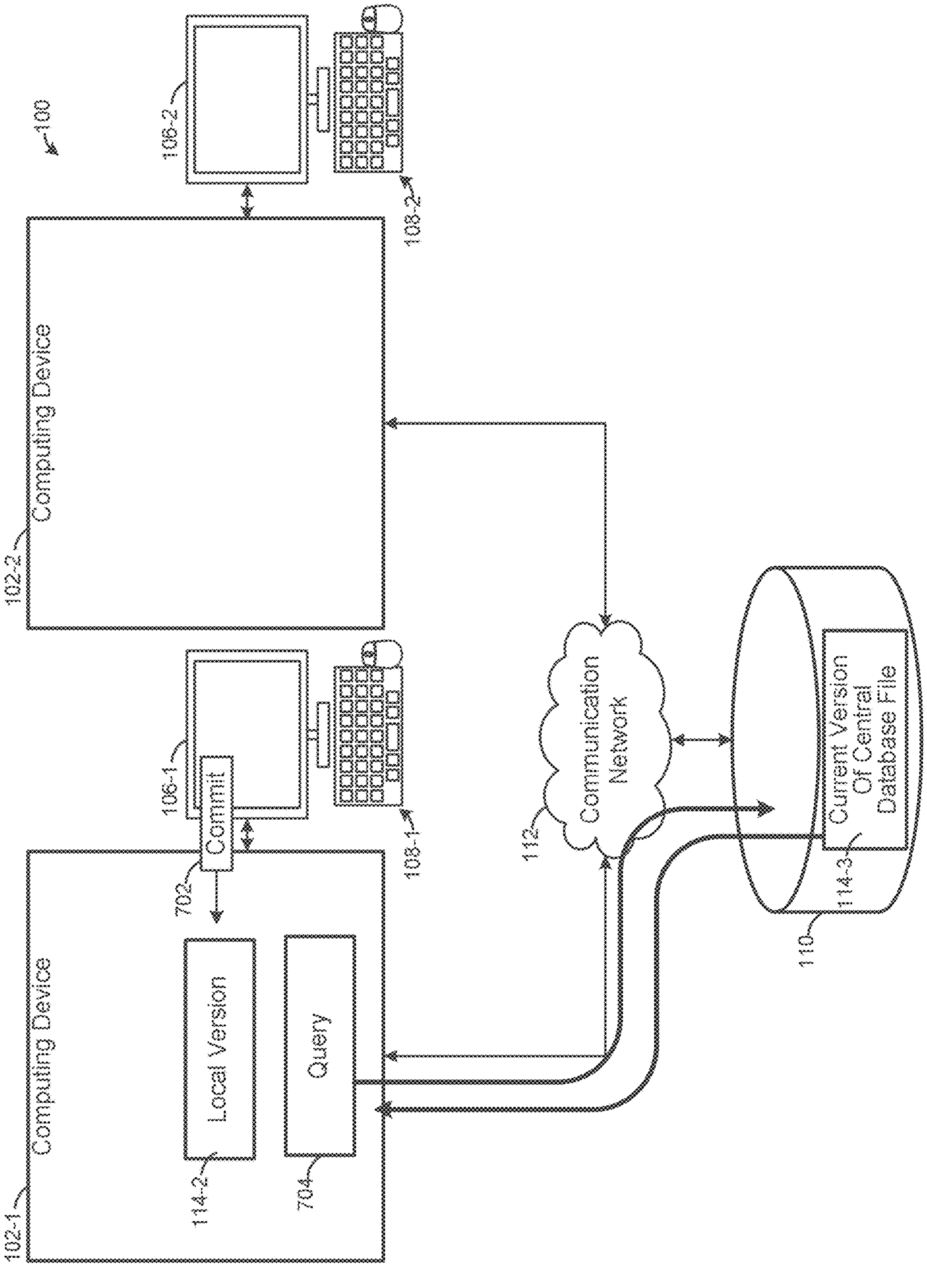
FIG. 7 depicts the system of FIG. 1 implementing aspects of a method for obviating conflicts in database updates, according to non-limiting examples.

With attention next directed to FIG. 7, after the central database file 114-1 is changed to a current version 114-3, the first computing device 102-1 receives a command 702, via the input device 106-1, to commit the local version 114-2 of the central database file 114-1 to the central database 110. As such, the first computing device 102-1 may query 704 the central database 110 to retrieve a copy of metadata associated with the current version 114-3 and/or (as depicted) the query 704 may result in a copy of the current version 114-3 being retrieved from the central database 110 (e.g, at the block 304 and/or the block 306), though, prior to retrieving the current version 114-3 from the central database 110, the first computing device 102-1 may retrieve metadata of the current version 114-3, such a timestamp, a version number, a hash, and the like.

Figure 8:
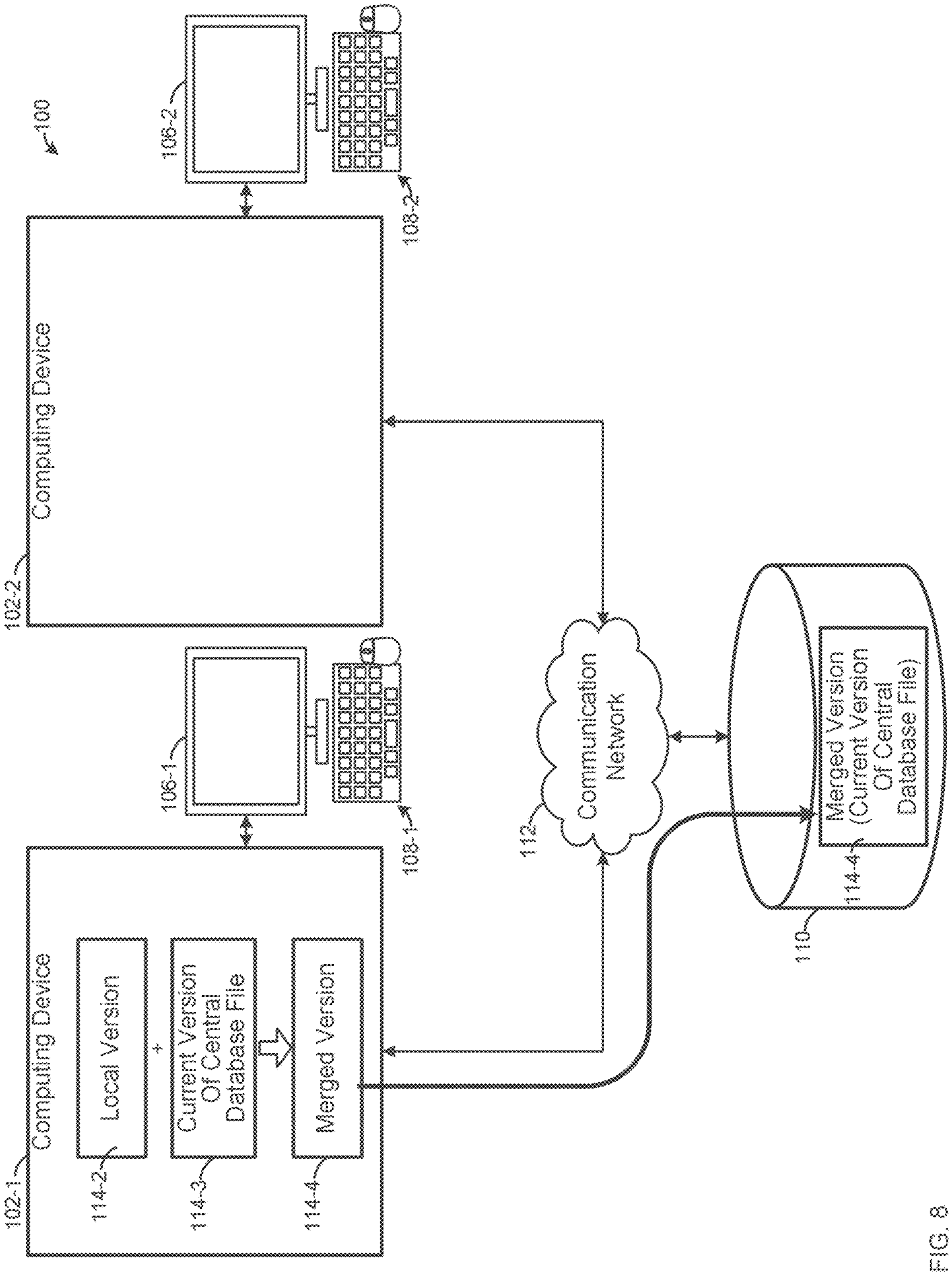
FIG. 8 depicts the system of FIG. 1 implementing further aspects of the method for obviating conflicts in database updates, according to non-limiting examples.
Figure 9:
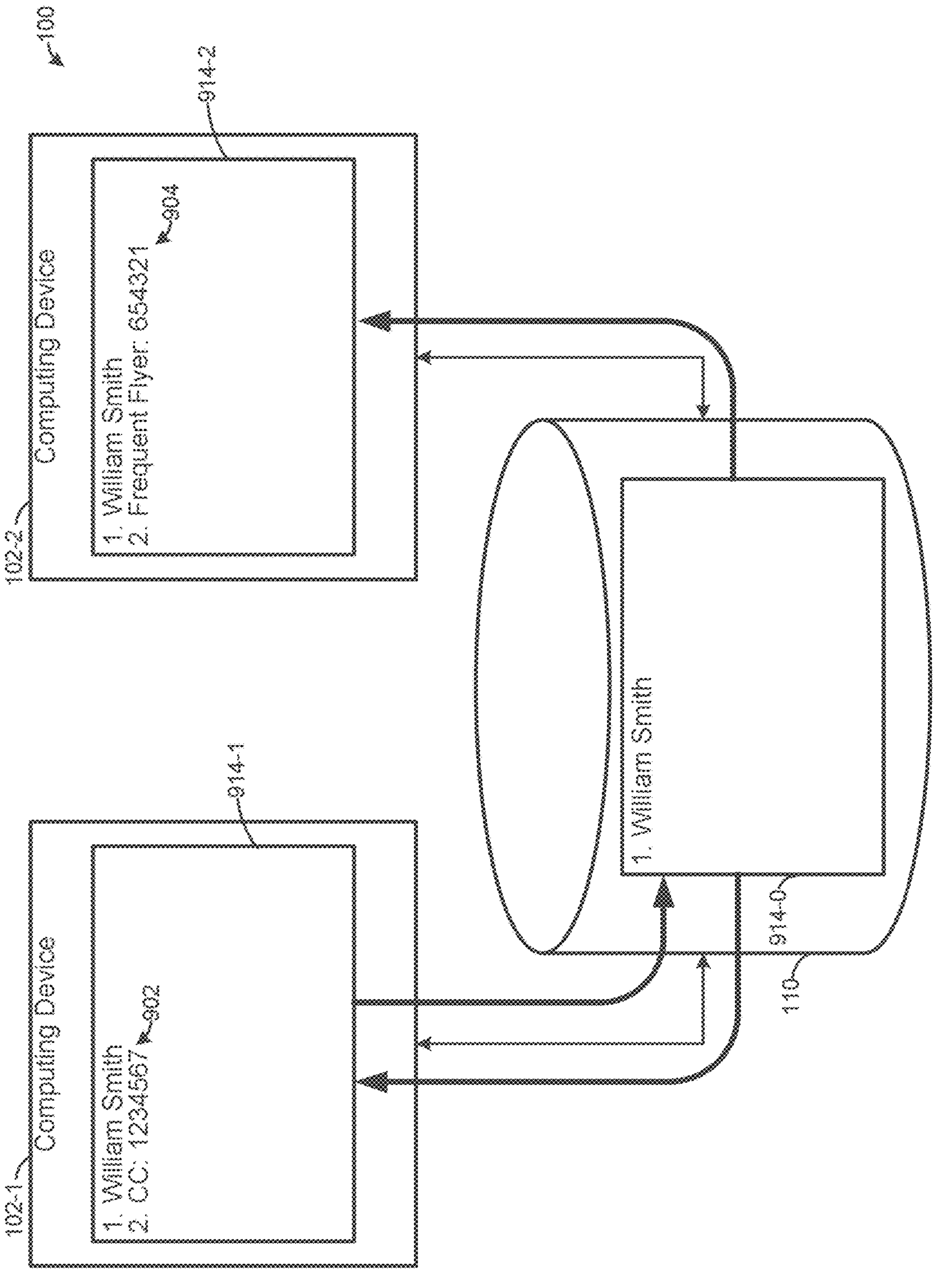
FIG. 9 depicts the system of FIG. 1 implementing additional aspects of a method for obviating conflicts in database updates, according to non-limiting examples.

Regardless, the first computing device 102-1 determines that a change has been made to the central database file 114-1 (e.g, a "YES" decision at the block 304 of the method 300) as has been previously described. While a similar query is not depicted in FIG. 6 with respect to the second computing device 102-2 determining that no changes have been made to the central database file 114-1, it is understood that the second computing device 102-2 may implement such a similar query:

With attention next directed to FIG. 8, the first computing device 102-1 merges (e.g, at the block 308 of the method 300), the local version 114-2 with the current version 114-3 (e.g. represented by a plus ("+") sign in FIG. 9) to generate a merged version 114-4 of the original database file 114-1. The first computing device 102-1 replaces (e.g, at the block 310 of the method 300), the current version 114-3 with the merged version 114-4 at the central database 110, by overwriting the current version 114-3 with the merged version 114-4 at the central database 110. Hence, the merged version 114-4 as stored at the central database 110 becomes a current version 114-4 of the central database file 114-1.

It is understood that while the example of FIG. 4, FIG. 5, FIG. 6, FIG. 7 and FIG. 8 show the merging of the local version 114-2 and the current version 114-3 of the central database file 114-1 occurring when an attempt to commit the local version 114-2 to the central version occurs, it is understood that such merging may occur whenever a change 402 is made to the local version 114-2. For example, when a change 402 is made to the local version 114-2, the first computing device 102-1 may perform the block 304 of the method 300 and, when a change has occurred to the central database file 114-1, the merging of the block 308, and the storing of the block 310, may occur. The method 300 may then continue at the first computing device 102-1, but using the merged version 114-4 of the central database file 114-1.

When a similar process is performed at the second computing device 102-2, when a change 502 is made to the local version 114-3, the second computing device 102-2 may perform the block 304 of the method 300 and, when a change has occurred to the central database file 114-1, for example when the first computing device 102-1 performs the storing of the block 310 when a respective change 402 occurs to its local version 114-2, the merging of the block 308, and the storing of the block 310, may occur at the second computing device 102-2. The method 300 may then continue at the second computing device 102-2, but using a respective merged version of the central database file 114-1.

In this manner, a change 402 made to the local version 114-2 at the first computing device 102-1 results in a merged version being generated and committed to the central database 110, which is merged with the local version 114-3 at the second computing device 102-2, and which may continue to be changed at the second computing device 102-2. Conversely, a change 502 made to the local version 114-3 at the second computing device 102-2 results in a merged version being generated and committed to the central database 110, which is merged with the local version 114-2 at the first computing device 102-2, and which may continue to be changed at the first computing device 102-1. In this manner, changes made to respective local versions of the central database file 114-1 at one computing device 102 are committed as changes are made, and merged with other local versions at other computing devices 102.

Figure 10:
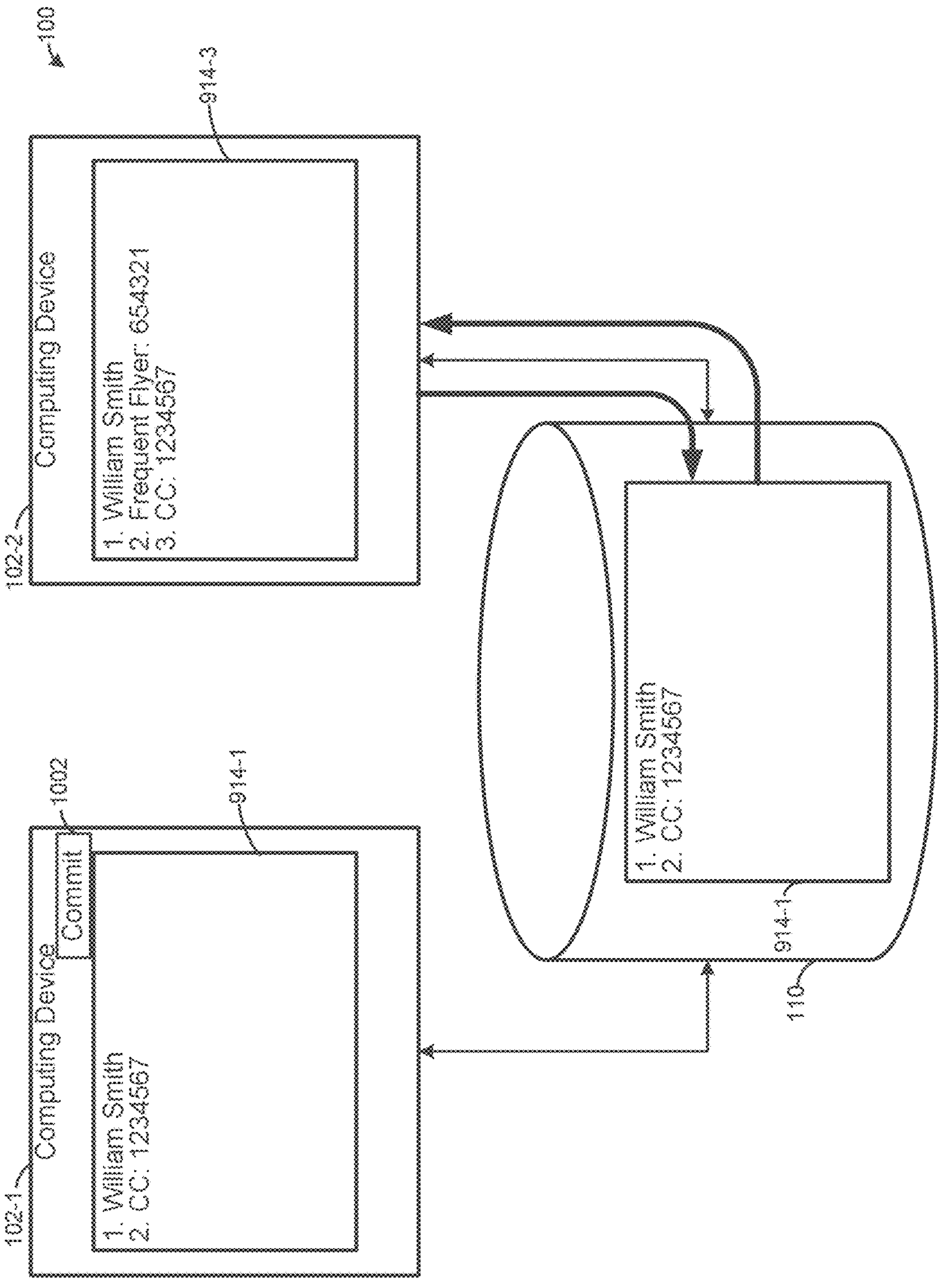
FIG. 10 depicts the system of FIG. 1 implementing further additional aspects of the method for obviating conflicts in database updates, according to non-limiting examples.
Figure 11:
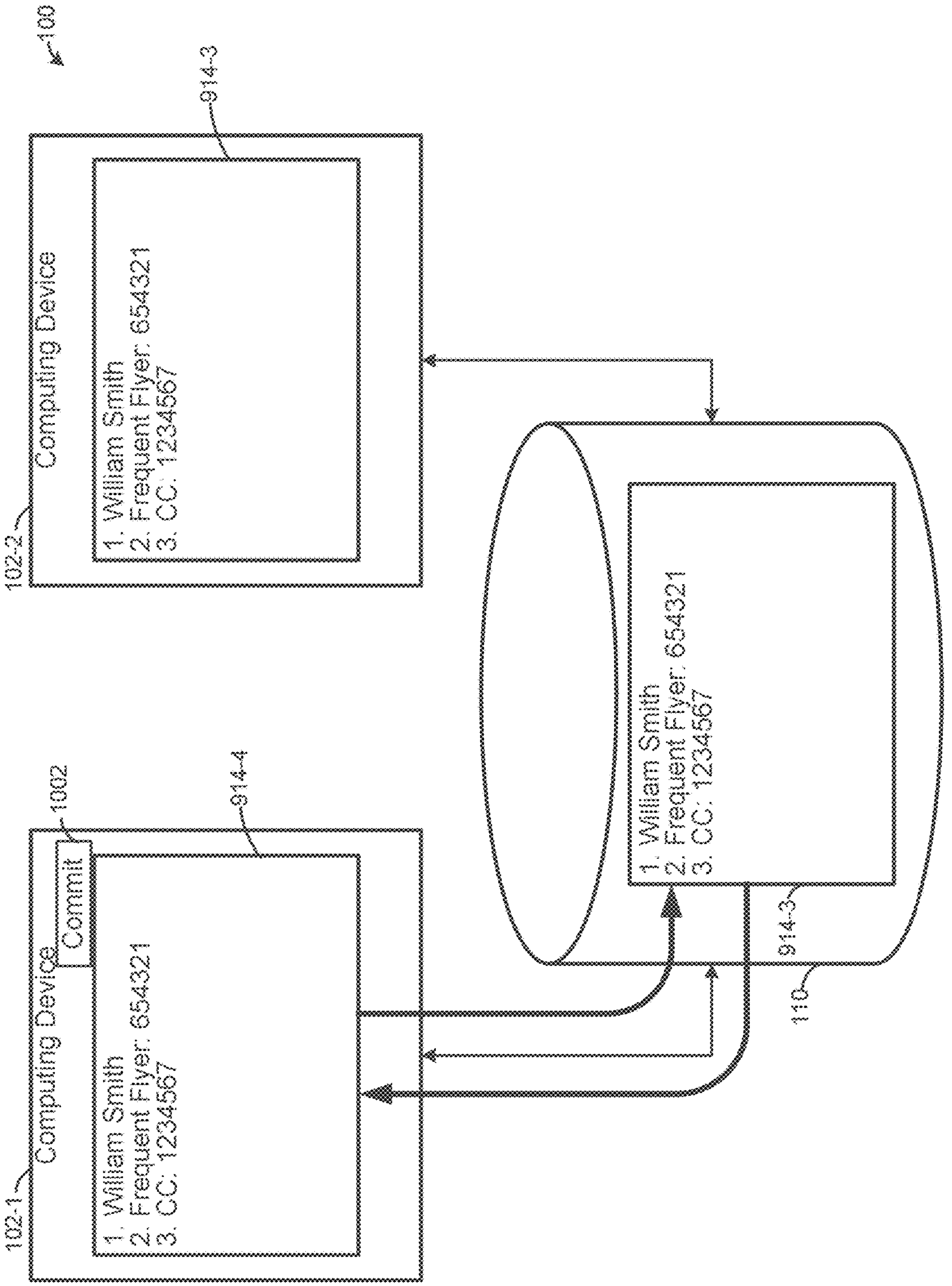
FIG. 11 depicts the system of FIG. 1 implementing further additional aspects of the method for obviating conflicts in database updates, according to non-limiting examples.

Attention is next directed to FIG. 9, FIG. 10, and FIG. 11, which depict another example of the method 300. FIG. 9, FIG. 10, and FIG. 11 are substantially similar to FIG. 1, with like components having like numbers. It is understood in FIG. 9, FIG. 10, and FIG. 11 that both the computing devices 102-1, 102-2 are implementing the method 300. Furthermore, for simplicity; not all components of the system 100 are depicted, such as the communication network 112, the merging engines 104, the display screens 106 and the input devices 108, but they are nonetheless understood to be present.

With attention first directed to FIG. 9, as depicted, the central database 110 stores a central database file 914-0, which comprises one field "1. William Smith" including a name of an associated person. Furthermore, the field is identified by an identifier "1".

It is further understood that both the computing devices 102 are implementing the method 300 and have each retrieved a copy of the central database file 914-0, to generate respective local versions 914-1, 914-2 of the central database file 914-0.

As depicted, it is understood that both the computing devices 102 are making respective changes to the respective local versions 914-1, 914-2. For example, the first computing device 102-1 is adding a field including data 902 "2. CC: 1234567" including a credit card (e.g. "CC") number, identified by an identifier "2". Similarly, the second computing device 102-2 is adding a field including data 904 "2. Frequent Flyer: 654321" including a frequent flyer (e.g. "FF") number, also identified by an identifier "2".

In this example, it is assumed that the addition of the data 902 to the local version 914-1 at the first computing device 102-1 occurs prior to the addition of the respective data 904 to the respective local version 914-2 at the second computing device 102-2. As such, when a change to the local version 914-1 occurs, as represented by the data 902, the first computing device 102-1 may determine that the central database file 914-0 has not changed and hence no merging occurs: rather, the first computing commits the local version 914-1 to the central database 110, as a current version 914-1 of the central database file 914-0.

Attention is next directed to FIG. 10, which depicts the current version 914-1 of the central database file 914-0 being stored at the central database 110. It is further understood in FIG. 10 that the second computing device 102-2 has now added the data 904 to the local version 914-2, and further determines that the central database file 914-0 has changed to the current version 914-1 at the central database 110. As such, the second computing device 102-2 retrieves the current version 914-1 from the central database 110 and merges the current version 914-1 with the respective local version 914-2, generating a merged version 914-3 of the local version 914-2 and the current version 914-1. As both the frequent flyer field and the credit card field are identified by "2", the second computing devices 102-2 resolves this conflict and reidentifies/renumbers the credit card field as "3" in the merged version 914-3. The second computing device 102-2 then commits the merged version 914-3 to the central database 110 as a current version 914-3 of the central database file 914-0.

Also depicted in FIG. 10, it is understood that, after the second computing device 102-2 commits the merged version 914-3 to the central database 110, a commit command 1002 is received at the first computing device 102-1.

Attention is next directed to FIG. 11, which depicts the first computing device 102-1, in response to the commit command 1002, determining that the central database file 914-0 has again changed and hence generated a merged version 914-4 of the central database file 914-0 from the local version 914-1 and the current version 914-3 retrieved from the central database 110. As such, the merged version 914-4 now includes the frequent flyer number identified by "2", and the credit card number identified by "3". The first computing device 102-1 then commits the merged version 914-4 to the central database 110. It is understood that the merged version 914-4 may be reviewed via the display screen 106-1 prior to being committed, even when the commit command 1002 has been received in the event that more changes are to be made to the merged version 914-4 after being generated. For example, the frequent flyer number may be reviewed and corrected if incorrect: when such a change occurs, the process depicted in FIG. 9, FIG. 10 and FIG. 11, such that both computing devices 102 may have access to the same information.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot synchronize databases, interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only. Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

generating, at a computing device, a local version of a central database file stored at a central database accessible by a plurality of computing devices, including the computing device, the central database file changeable by any of the plurality of computing devices, the local version comprising a copy of the central database file, the plurality of computing devices being different from the central database;

in response to initiating one or more of storing and committing the local version of the central database file to the central database, and after generating the local version, but before the one or more of storing or committing the local version to the central database occurs, communicating, at the computing device, with the central database to determine whether the central database file has changed at the central database; and in response to determining, at the computing device, that a change has occurred to the central database file at the central database, since the local version was generated, the central database file, as changed at the central database, comprising a current version of the central database file different from the central database file from which the local version was generated:

retrieving, at the computing device, from the central database, the current version of the central database file;

merging, at the computing device, the local version and the current version of the central database file to generate a merged version of the central database file; and replacing, via the computing device, at the central database, the current version of the central database file with the merged version of the central database file.

2. The method of claim 1, further comprising, prior to the merging, altering the local version of the central database file by at least one of:

one or more of changing, adding and deleting data at the local version of the central database file;

one or more of changing, adding and deleting fields at the local version of the central database file; and one or more of changing, adding and deleting a structure of the local version of the central database file.

3. The method of claim 1, wherein determining the change has occurred to the central database file, as stored at the central database, occurs in response to altering the local version of the central database file.

4. The method of claim 1, wherein determining the change has occurred to the central database file, as stored at the central database, occurs in response to initiating one or more of storing and committing the local version of the central database file to the central database.

5. The method of claim 1, wherein merging the local version and the current version of the central database file to generate the merged version of the central database file comprises:

resolving conflicts between respective data from the local version and the current version of the central database file.

6. The method of claim 1, wherein merging the local version and the current version of the central database file to generate the merged version of the central database file comprises one or more of:

changing same identifiers of respective data in the local version and the current version of the central database file to different identifiers in the local version copying, from the local and the current version to the merged version, identifiers of given data.

7. The method of claim 1, further comprising:

after generating the local version, rendering, at a display screen, data from the local version; and in response to determining that the change has occurred to the central database file, as stored at the central database and in further response to retrieving the current version of the central database file: updating, at the display screen, the rendering of the local version to include respective data from the current version of the central database file.

8. The method of claim 1, further comprising, prior to the merging:

comparing the local version and the current version of the central database file; and responsive to the comparing:

determining that the local version and the current version of the central database file are incompatible with being merged by failing to identify respective data fields that are one or more of similar and different at the local version and the current version of the central database file; and discarding the local version of the central database file in favor of the current version of the central database file such that the current version of the central database file becomes a new local version of the central database file.

9. A computing device comprising:

a communication interface; and a controller configured to:

generate a local version of a central database file stored at a central database accessible by a plurality of computing devices, including the computing device, the central database file changeable by any of the plurality of computing devices, the local version comprising a copy of the central database file, the plurality of computing devices being different from the central database;

in response to initiating one or more of storing and committing the local version of the central database file to the central database, and after generating the local version, but before the one or more of storing or committing the local version to the central database occurs, communicate, via the communication interface, with the central database to determine whether the central database file has changed at the central database; and in response to determining that a change has occurred to the central database file, as stored at the central database, since the local version was generated, the central database file, as changed at the central database, comprising a current version of the central database file different from the central database file from which the local version was generated:

retrieve, via the communication interface, from the central database, the current version of the central database file;

merge the local version and a current version of the central database file to generate a merged version of the central database file; and replace, via the communication interface, at the central database, the current version of the central database file with the merged version of the central database file.

10. The computing device of claim 9, wherein the controller is further configured to, prior to the merging, alter the local version of the central database file by at least one of:

one or more of changing, adding and deleting data at the local version of the central database file;

one or more of changing, adding and deleting fields at the local version of the central database file; and one or more of changing, adding and deleting a structure of the local version of the central database file.

11. The computing device of claim 9, wherein the controller is further configured to determine the change has occurred to the central database file, as stored at the central database, in response to altering the local version of the central database file.

12. The computing device of claim 9, wherein the controller is further configured to determine the change has occurred to the central database file, as stored at the central database, in response to initiating one or more of storing and committing the local version of the central database file to the central database.

13. The computing device of claim 9, wherein the controller is further configured to merge the local version and the current version of the central database file to generate the merged version of the central database file by:

resolving conflicts between respective data from the local version and the current version of the central database file.

14. The computing device of claim 9, wherein the controller is further configured to merge the local version and the current version of the central database file to generate the merged version of the central database file by one or more of:

changing same identifiers of respective data in the local version and the current version of the central database file to different identifiers in the local version; and copying, from the local version, to the merged version, identifiers of given data, and copying, from the current version, to the merged version, respective identifiers of respective given data that is new in the current version relative to the local version.

15. The computing device of claim 9, wherein the controller is further configured to, prior to the merging:

compare the local version and the current version of the central database file; and responsive to the comparing:

determine that the local version and the current version of the central database file are incompatible with being merged by failing to identify respective data fields that are one or more of similar and different at the local version and the current version of the central database file; and discard the local version of the central database file in favor of the current version of the central database file such that the current version of the central database file becomes a new local version of the central database file.

16. The method of claim 1, wherein the merged version comprises a single merged version comprising a mixture of respective data from each of the local version and the current version of the central database file.

17. The method of claim 1, wherein the merging comprises:

replacing the local version of the central database file with the current version of the central database file.

18. The computing device of claim 9, wherein the merged version comprises a single merged version comprising a mixture of respective data from each of the local version and the current version of the central database file.

19. The computing device of claim 9, wherein the controller is further configured to:

after generating the local version, render, at a display screen, data from the local version; and in response to determining that the change has occurred to the central database file, as stored at the central database and in further response to retrieving the current version of the central database file: update, at the display screen, the rendering of the local version to include respective data from the current version of the central database file.

20. The computing device of claim 9, wherein the controller is further configured to merge the local version and a current version of the central database file to generate the merged version of the central database file by:

replacing the local version of the central database file with the current version of the central database file.

* * * * *